United States Patent [19]

Thern et al.

[11] 4,332,492
[45] Jun. 1, 1982

[54] DEVICE FOR CONTROLLING THE CARRIAGE MOVEMENT IN A PRINTER

[75] Inventors: Rolf A. B. Thern; Peter Dahlberg, both of Järfälla, Sweden

[73] Assignee: U.S. Philips Corporation, New York, N.Y.

[21] Appl. No.: 76,875

[22] Filed: Sep. 19, 1979

[30] Foreign Application Priority Data

Sep. 20, 1978 [SE] Sweden ............................ 7809895
Aug. 29, 1979 [SE] Sweden ............................ 7907196

[51] Int. Cl.³ ............................................ B41J 19/00
[52] U.S. Cl. .................................. 400/320; 400/322; 400/705.1; 318/571; 318/653
[58] Field of Search .............. 400/126, 320, 322, 705, 400/705.1; 318/39, 571, 653; 324/173, 179; 336/129; 340/195, 196, 197, 198, 199, 670

[56] References Cited

U.S. PATENT DOCUMENTS

| | | | |
|---|---|---|---|
| 3,056,909 | 10/1962 | Tripp | 340/196 X |
| 3,090,934 | 5/1963 | Farrand | 340/196 X |
| 3,136,218 | 6/1964 | Tripp | 318/39 X |
| 3,522,568 | 8/1970 | Hasbrouck | 340/196 X |
| 3,596,222 | 7/1971 | Pagella | 336/129 |
| 3,639,753 | 2/1972 | Reich | 324/173 X |
| 3,668,377 | 6/1972 | Inaba et al. | 318/571 |
| 3,836,835 | 9/1974 | Sawyer | 318/571 X |
| 3,986,091 | 10/1976 | Quiogue et al. | 400/322 X |
| 4,005,396 | 1/1977 | Fujiwara et al. | 340/196 |
| 4,050,564 | 9/1977 | Carmichael et al. | 400/126 |
| 4,138,688 | 2/1979 | Heard et al. | 400/126 X |
| 4,146,922 | 3/1979 | Brown et al. | 400/320 X |
| 4,169,991 | 10/1979 | Ross | 400/322 X |

FOREIGN PATENT DOCUMENTS

2000885 1/1979 United Kingdom ................ 400/322

OTHER PUBLICATIONS

IBM Technical Disclosure Bulletin, "Speed Regulation for Brushless DC Motors", Keidl, vol. 19, No. 10, Mar. 1977, pp. 3831–3832.

*Primary Examiner*—Ernest T. Wright, Jr.
*Attorney, Agent, or Firm*—Robert S. Smith

[57] ABSTRACT

In a printer comprising a printing head, which is supported by a carriage, the carriage position along a record carrier is sensed at two occasions. A cooperating micro processor calculates an actual carriage speed on the basis of the position values which are obtained. The actual carriage speed and an optimal carriage speed, which is stored, are compared and on the basis of this comparison a compensation factor is calculated for a reference signal (Ref) which determines the carriage speed. This compensation factor is checked at each carriage movement by measuring the carriage speed. Accordingly a permanently optimal carriage speed is secured and the need of an accurate trimming of the carriage speed is eliminated during manufacture as well as at later service periods.

2 Claims, 3 Drawing Figures

DEVICE FOR CONTROLLING THE CARRIAGE MOVEMENT IN A PRINTER

The invention is directed to a device for controlling the carriage movement in a printer comprising a printing head supported by the carriage and which is moved along a record carrier by the carriage movement. The carriage is moved by means of a direct current motor supported by the movable carriage or, alternatively is stationary in the printer, the direct current motor being supplied by a drive unit which compensates for variations of load during the carriage movement. The invention is also directed to a device for carrying out the method.

In printers of the type in question direct current motors are ordinarily used for driving the carriage thereof. The direct current motor will have its supply voltage provided by a drive unit which compensates for load variations during the carriage movement. The compensation is accomplished by detection of the current which is supplied to the direct current motor. As a consequence of the difference between different motor units trimming of the drive unit is performed during manufacture of the printer. The drive unit is thereby adjusted so as to generate a supply voltage to the actual direct current motor of such a value that a given desirable and optimal carriage speed is obtained. As a consequence of the fact that some long-time deviation in the drive unit will always appear, as also mechanical wear of used mechanical parts for guiding the carriage, and the change of load of the motor which follows the trimming operation will have to be renewed at later service periods.

The object of the invention is to provide a method for controlling the carriage movements as disclosed in the introduction of this description and which eliminates the need of trimming during manufacture as well as later service periods.

The object of the invention is obtained by means of a method which according to the invention is characterized in that the drive unit is supplied with a reference signal via a digital-to-analog converter from a microprocessor disposed within the printer, the carriage being thereby moved along at a carriage speed which corresponds to said reference signal, in that the carriage position along the record carrier is detected at two occasions when the carriage has reached the constant carriage speed which corresponds to said reference signal, in that the position information, after being eventually digitalized, is supplied to said microprocessor for calculating the actual carriage speed, in that the so calculated carriage speed is compared with an optimal carriage speed value, which is stored in the microprocessor, and a compensation factor for the actual reference signal is calculated on the basis of the comparison, in that a reference signal, which has been modified by said compensation factor, is supplied to the drive unit during the next following carriage movement, and in that said compensation factor is checked during each carriage movement by repeating the indicated steps. In the method according to the invention is used a so-called open loop control for controlling said motor. The advantage of a control loop of this type in this connection is that appearing oscillations and appearing tolerances of the mechanical transmission which is used for driving the carriage will not initiate self oscillations as a consequence of a feed back phase deviation in the control loop, which may follow from the use of a closed loop control. Start and returning of the carriage 5 also will not give rise to any problems when using the method according to the invention since the speed measurement, with a knowledge of the driving motor characteristic, is not performed until the carriage has definitely reached a constant speed.

According to the invention a device for controlling the carriage movement in a printer comprising a printing head not shown which is supported by the carriage 5 and which is moved along a record carrier by the carriage movement, a direct current motor for moving the carriage and being supported by the movable carriage or, alternatively, being stationarily mounted in the printer, and a drive unit for supplying a drive signal to the direct current motor, in which the drive unit compensates for variations of load during the carriage movement, is characterized in that it is also provided with a carriage position indicator and a timing circuit for detecting the position of the carriage in relation to a position reference point at two occasions determined by said timing circuit. A signal processing circuit is also provided for analog-to-digital conversion of the carriage position values which are obtained and for supplying the values to a microprocessor. The microprocessor is arranged to calculate therefrom an actual carriage speed between said two occasions and to compare this calculated speed with a stored, optimal carriage speed, and to calculate, on the basis of said comparison, a compensation factor for a reference signal value which is generated by the microprocessor 12 and which is supplied to the drive unit via a digital-to-analog converter during the next following carriage movement.

One embodiment of the device according to the invention will be described in greater detail with reference to the drawing, in which.

For detecting the carriage position this embodiment uses a so-called Meander-indicator comprising a stationary Meander-element 1 arranged in the printer and being extended in the direction of movement of the carriage 5 along the printing width of the printer. As will be apparent from the following description, each Meander element is a serpentine element which is suitable for inductive coupling. On said carriage 5 two further Meander-elements 2, 3 are arranged, the elements 2 and 3 being arranged so as to obtain a physical displacement of the Meander-structures which is equal to ¼ period of the Meander-structure (corresponding to an electrical phase deviation of 90°) with respect to the stationary Meander element 1. The distance between the element 1 and the indicator elements 2, 3 is so selected that a good inductive coupling is obtained between the stationary element 1 and the movable elements 2, 3. The movable elements 2, 3 are supplied, by the signal processing circuit 4, two sine wave signals having a relative phase deviation of 90°. The signal, which is then induced in the stationary indicator element 1, is supplied to the signal processing circuit 4. The operation and structure thereof will be described in greater detail in connection with FIG. 2.

Figure 1:
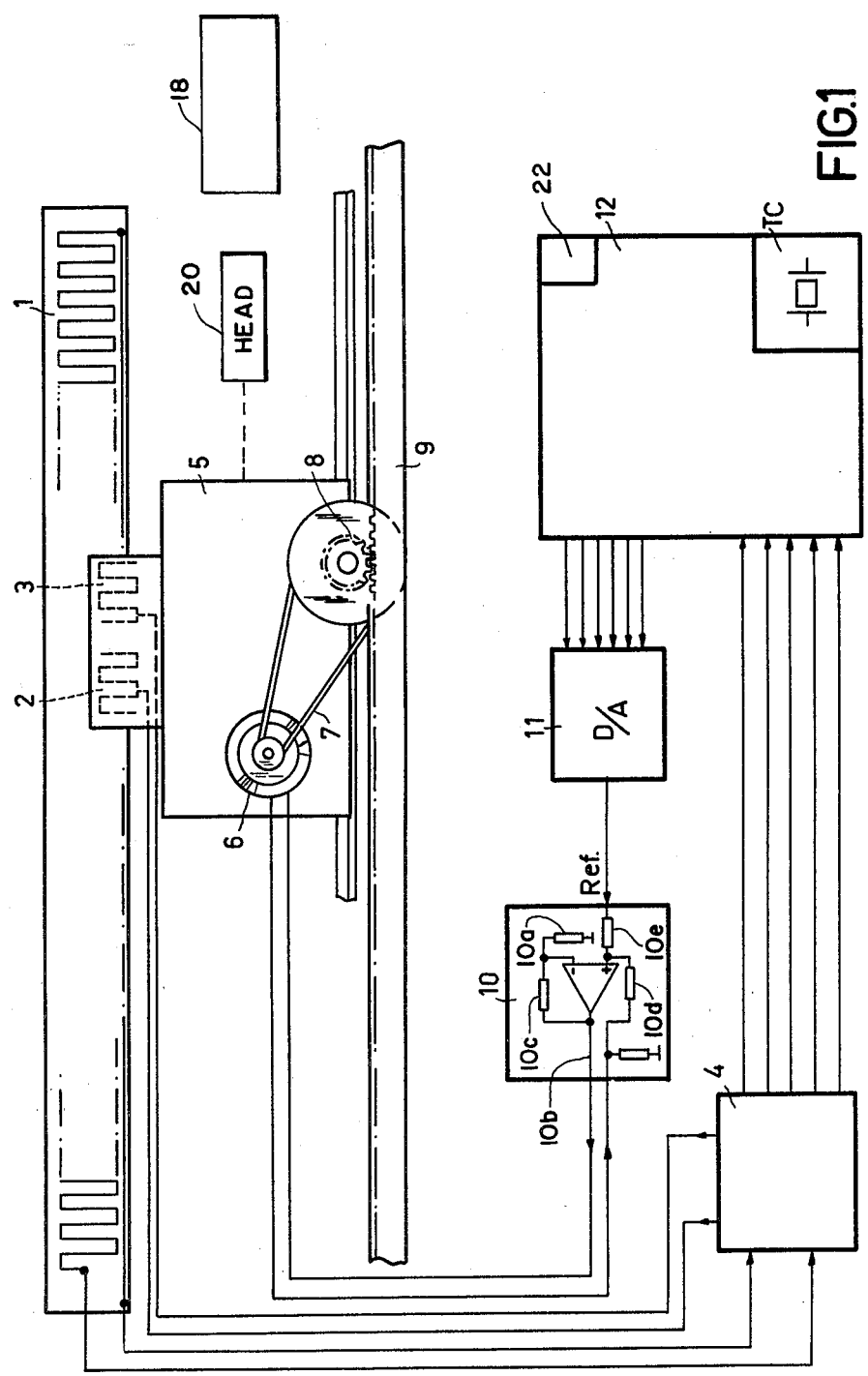
FIG. 1 shows schematically the components of the device according to the invention.

FIG. 1 discloses furthermore a schematic carriage 5 and an associated drive motor 6, which via toothed belt 7 drives a gear wheel 8 which is engaged with a toothed rack 9 fixed to the printer. When the motor 6 is rotated the carriage 5 is moved by means of the gear wheel 8 and the toothed rack 9.

The direct current motor 6 is supplied by a supply voltage from a drive circuit 10, said circuit 10 being supplied with a reference signal Ref from a digital-to-analog converter 11, which in turn is supplied with a digital reference signal value from a microprocessor 12. It further is evident from the drawing the microprocessor 12 is provided with a crystal timing circuit TC which may be used for determining the occasions when the position of the carriage 5 should be detected.

The drive circuit 10 is of a type which is commonly used in tape recorders and record players. As shown within the block drive circuit 10 of FIG. 1 the drive circuit 10 comprises a differential amplifier 10a to the +input of which the Ref signal is supplied and the output 10b of which is connected to one pole of motor 6 and also feed-back coupled to the −input of the amplifier 10a via a resistor 10c. The second pole of motor 6 is connected to earth via a resistor 10d and also to the +input of the amplifier 10a via a resistor 10c.

Figure 2:
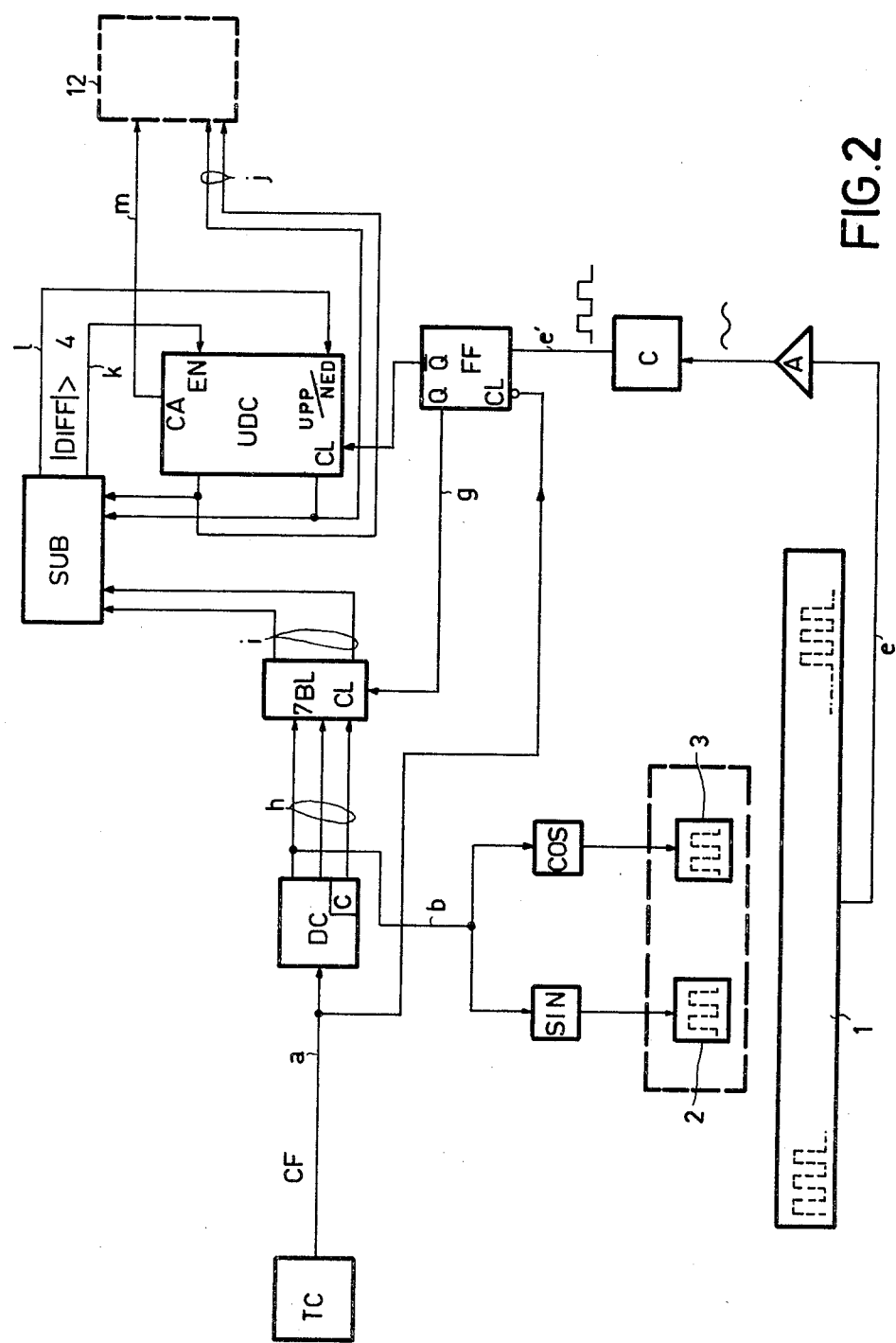
FIG. 2 shows a circuit diagram of the signal processing circuit of FIG. 1.

In FIG. 2 the signal processing circuit 4 of FIG. 1 is disclosed in greater detail. Also shown are the indicator elements 1, 2, 3 which are connected thereto and also the crystal timing circuit TC which is disposed within the microprocessor 12 in FIG. 1.

The basic frequency of the microprocessor 12 is 6.144 MHz and this frequency is divided by the factor of 2 so as to obtain from the timing circuit TC the frequency of 3.07 MHz. This frequency TC is referred to as the clock frequency CF hereafter.

The clock frequency CF is supplied to a frequency divider DC comprising a counter C counting down the clock frequency by the factor of 128 and thereby a signal of the approximate frequency of 24 kHz is obtained. This frequency is designated as primary frequency hereafter.

The basic or primary frequency is supplied to a sinus or sine wave generator SIN and a cosinus current generator COS. The output signals from these generators SIN, COS are each supplied to a separate one of said Meander-elements 2 and 3, respectively, being designated as primary elements 2, 3 hereafter. The primary elements 2, 3 are provided on a common circuit board which in turn is supported by the carriage 5.

The period of each Meander-structure is 3.92 mm and this period divided by 128 (approximately 0.0302 mm) is the smallest detectable change of the carriage position. It is also the subdistance which in a printer comprising a matrix print head, is used for obtaining the distance between two columns in the character matrix which is used for printing of characters having different character distances, e.g. 1/15, 1/12 or 1/10 inch.

The signals of the primary elements 2, 3 are supplied inductively to (the secondary) Meander-element 1. The secondary element 1 comprises a Meander-structure of the same period as elements 2, 3.

In element 1 the induced signals are added and thereby a signal of a constant amplitude is formed having a phase value in relation to the primary frequency signal which varies proportionally to the movement of the primary elements 2, 3 along the secondary element 1. The phase deviation will pass by the value of 0 (a multiple of 360°) each time when the Meander-structures of elements 1, 2, 3 reach a defined relative position, i.e. after each movement of 3.92 mm.

If the output signal from generators SIN and COS are E sin ωt and E cos ωt, respectively, the output signal e of the secondary element 1 will be as follows $$e = E \sin \omega t \cos \beta + E \cos \omega t \sin \beta = E \sin (\omega t + \beta)$$

in which $\beta$ is the value of the phase angle which depends on the movement.

The voltage e is amplified in the amplifier A and is pulse shaped in the converter C to a rectangular wave form the frequency (the secondary frequency) of which will consequently correspond to the primary frequency (approximately 24 kHz) supplied by the frequency divider DC, and having a phase deviation ($\beta$) with respect to the primary frequency which depends on the carriage position. Accordingly, it is necessary to convert this phase deviation to a digital value to be supplied to the microprocessor 12. In order to obtain the position of the carriage 5 the zero crossings of the phase deviation must also be recorded.

For this purpose a so-called 7 bit latch circuit 7BL, a subtractor SUB and an up/down counter UDC are interconnected as shown in FIG. 2.

The 7-bit latch circuit 7BL and the counter UDC are clocked (CL) together by the secondary frequency signal, which, however, is first passed through a flip-flop FF, which is clocked by the clock frequency CF, the latch circuit 7BL being clocked on each positive edge and being thereby latched to the current position of the frequency divider DC.

The frequency divider circuit DC further includes a counter c. The aim of the flip-flop FF is to eliminate the hazard condition which may arise if the latch circuit 7BL or the up/down counter UDC is clocked and the counter c of the frequency divider DC is progressed one step simultaneously.

When the phase of the secondary frequency signal is changed the position of the latch circuit 7BL will be changed correspondingly. In order not to obtain an unstable indication due to noise and small disturbances, e.g. so that the position will vary between 0 and 127, a 7-bit up/down counter UDC is utilized. The counter UDC is then made to follow the latch circuit 7BL with some amount of a backlash, e.g. three units which corresponds to three of the subdistances and equals about 8×0.03=0.24 mm. This is obtained by comparing the positions of the counter UDC and the latch circuit 7BL in a so-called "subber" (SUB), that is an adder with one input signal inverted. If it follows from this comparison that the counter UDC has a backlash which is more than e.g. seven units (|DIFF|>4) the counter UDC will be advanced one step on the negative edge of the secondary frequency, or also the counter UDC is stepped backwards one step if the counter UDC is leading by activating the counter UDC via input EN and UPP/NED.

Accordingly there is obtained on the output of the up/down counter UDC a noise free digital indication of the carriage 5 position within a period of the Meander-structure. The zero crossings of this indication, that is the crossings between the periods of the Meander-structure, are obtained by sensing the carry bit CA of the 7-bit counter UDC. Then also the direction of the zero crossing is sensed, that is if up or down counting is in question.

Both of the output signals from the up/down counter UDC are supplied to the microprocessor 12 as an indication of the carriage position.

Figure 3:
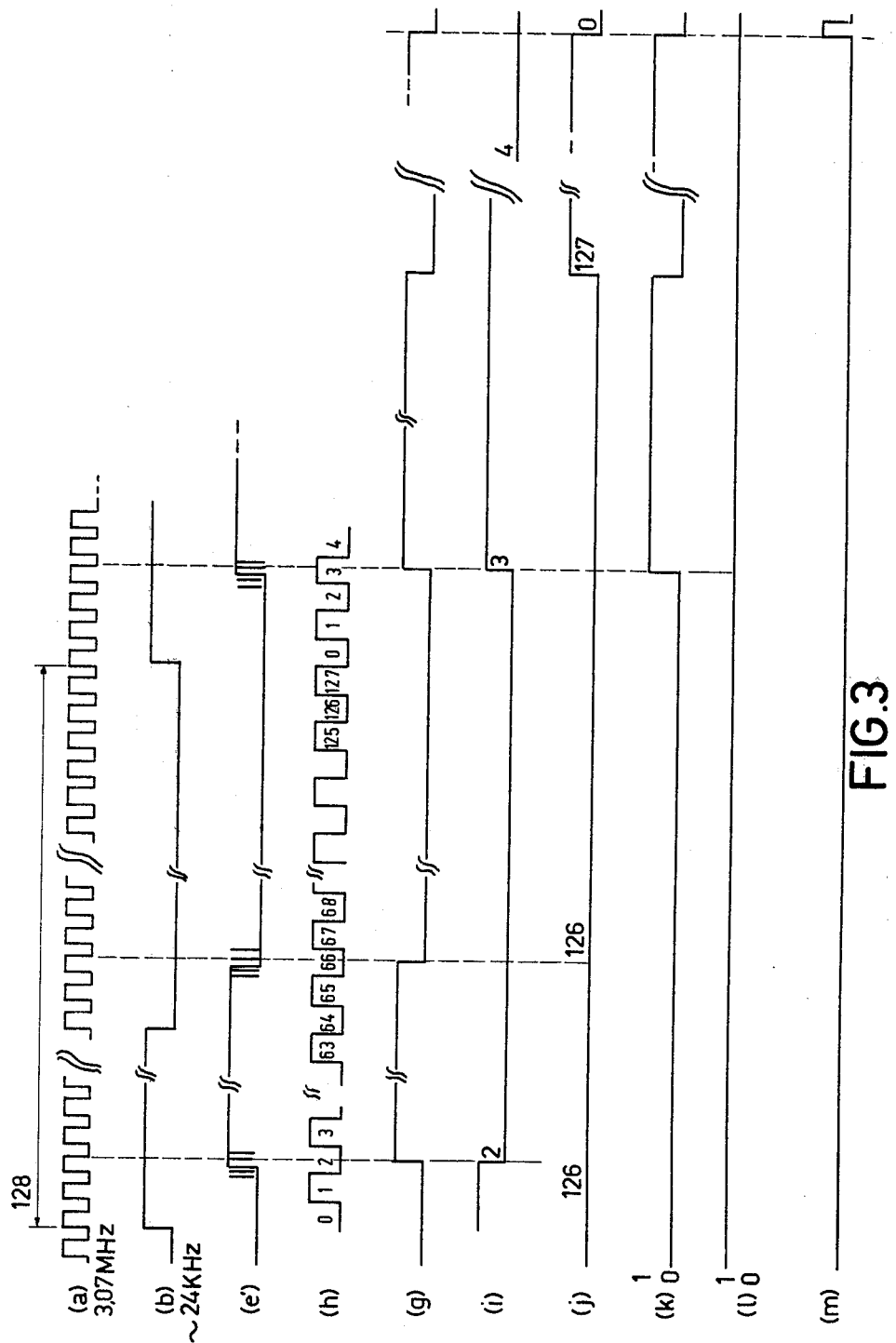
FIG. 3 shows a signal diagram of signals appearing at different points in FIG. 2.

In FIG. 3 is shown a signal diagram of signals in different points of the circuit diagram in FIG. 2.

Signal a shows the clock frequency signal CF having the frequency of 3.07 MHz.

Signal b shows the so-called primary frequency signal having the approximate frequency of 24 kHz, which is obtained by counting down signal a with a factor of 128 in the frequency divider DC. As shown in connection with signal a it follows therefrom that each period of the b-signal comprises 128 periods of the a-signal. Each period of the a-signal may also be said to represent the sub-distance of 0.0302 mm defined above and being the smallest detectable change of the carriage position.

From the secondary element 1 of the Meander-indicator the above mentioned signal e is obtained, the signal results after being pulse shaped in the converter C in the shown signal e'. The hazard of the edge position of signal e' is indicated by a number of different edge positions at each transition. In the case shown the carriage 5 has moved one sub-distance=0.0302 mm and therefore initiated a corresponding phase change of the second positive edge of said e'-signal.

Signal h from the counter c in the frequency divider DC is a binary number of 7 bits assuming values between 0 and 127 in synchronism with signal a. The h-signal in FIG. 3 is represented by a pulse train of which each half period represents an indicated value of the h-signal. At the first and second shown positive edges of the e'-signal this h-signal takes the value of 2 and 3, respectively.

Signal g represents the e'-signal after having passed through the flip-flop FF. From the diagram is clear that this flip-flop FF is clocked on the negative edges of the a-signal.

Signal i represents the value of the binary number of seven bits comprised in the latch circuit 7BL. This signal i is represented by a two-level signal having the signal value indicated at the transitions between said levels. From the diagram is clear that the latch circuit 7BL is clocked at the positive edges of signal g. Signals h and g then require that the i-signal has the value of 2 between the shown first and second, respectively, edges of the g-signal and thereafter the values 3, 4, etc.

Signal j represents the value of the binary number appearing on the output of counter UDC by means of a two-level signal the values of which are indicated at the transitions.

Signals i and j are compared in circuit SUB and if this comparison results in that counter UDC has a back lash to or leads the position of the latch circuit 7BL an amount which is greater than what corresponds to four units, i.e. four periods of signal a ($|DIFF| > 4$) the corresponding signal k of circuit SUB changes to a high level.

In the case shown the output signal j of counter UDC has initially the value of 126, while the i-signal has the value 2. Therefore the difference consists of the four values 127, 0, 1, 2, which is not greater than four units and consequently the k-signal will not change to its high level at the first appearing negative edge of signal g.

When later on the i-signal changes to the value 3 the requirement $|DIFF| > 4$ is fulfilled and the output signal k changes to the high level.

In the diagram the assumption is that the carriage 5 is moved in the one and same direction all the time and that appearing interferences are small, and so the difference between the i-signal and the j-signal will always be positive, which is indicated by a stationary high level of the signal l from the circuit SUB. The signal l is obtained from the output of the seventh bit thereof.

By the simultaneous high levels of signals l and k the requirement for advancement of the up/down counter UDC is fulfilled and this occurs at the next following negative edge of the g-signal, and thereat the j-signal will assume the value of 127 and at the same time k-signal will return to the low level.

FIG. 3 also illustrates what happens at a later stage when the carriage 5 has been moved another 0.0302 mm and as a consequence thereof the output signal i of the latch circuit 7BL has obtained the value of 4. Since the j-signal has the value of 127 the requirement $|DIFF| > 4$ holds, and the k-signal assumes its high level. At the next following negative edge of the g-signal the counter UDC is advanced and signal j changes to the value of 0 since a full period of the Meander-structure has been passed. At the same time a pulse is generated on the carry output of counter UDC which is indicated by the signal m.

The m-signal is supplied to the microprocessor 12 as an interrupt instruction actuating the microprocessor 12 to sense the signal j and to conclude therefrom the direction of the zero crossing by checking if the new position of counter UDC has the value of 0 or 127 and dependent thereon count up or down a stored value for the number of zero crossings.

As described above an accurate value of the carriage position is accessible for the microprocessor 12 at each moment by signals j and m. In a matrix-printer this information is used for the actuation of relevant printing needles which are part of the printing head 20 supported by the carriage 5. The needles cooperate with record carrier 18.

Determination of the carriage position at the two occasions according to the invention is made in control of the microprocessor program, and then the first occasion appears after the acceleration distance of the carriage 5, which is known by the characteristic of the drive motor 6.

At the first occasion the carriage 5 position is sensed as described above and at the same time a counter 22 in the microprocessor 12 is started, said counter 22 being thereafter advanced by the timing circuit TC thereof. In order to obtain a secure indication of the carriage position the position is sensed repeatedly and accepted first after reading of two equal values in succession. When the counter cycle has been run through the second occasion occurs and the carriage position is again sensed in the same manner. The distance of movement is calculated as the difference between the recognized carriage positions and with a knowledge of the cycle time of the counter 22 an actual value of the carriage speed is calculated which is thereafter compared with a stored optimal value. Based on this comparison there is thereafter calculated a correction factor of the reference signal Ref (FIG. 1) and a compensated Ref-signal is generated, said signal being supplied to the drive unit 10 via the D/A converter 11 during the next following carriage movement.

During the next following carriage movement a corresponding calculation of the actual carriage speed is made and dependent thereon there is again calculated an eventually changed reference value. The operation is repeated in the described manner during each following carriage movement.

The above describes a method and device for checking and eventually updating a carriage speed reference signal once per carriage movement. However, as should be obvious to anyone skilled in the art, the carriage speed may be sensed repeatedly during the carriage movement and corresponding reference signal values may be calculated and supplied to the drive unit, provided that a high speed, microprocessor is available.

What is claimed is:

1. A device for controlling carriage movement in a printer comprising a carriage, the carriage being movable along an associated record carrier, a direct current motor for moving the carriage, and a drive unit for generating a drive signal to the direct current motor, in which the drive unit compensates for load variations during carriage movement, characterized in that the device further comprises a carriage position indicator, a microprocessor, a digital-to-analog converter, means for pulse shaping and a timing circuit for sensing the position of the carriage in relation to a position reference point at two occasions which are determined by said timing circuit, a signal processing circuit for analog-to-digital conversion of the carriage position values which are obtained and for the supply of said values to said microprocessor, said microprocessor being arranged so as to calculate therefrom an actual carriage speed between said occasions and to compare this speed and an optimal carriage speed, which is stored in the microprocessor, and to calculate on the basis of this comparison, a compensation factor for a reference signal value which is generated by the microprocessor and supplied to the drive unit via said digital-to-analog converter during the next carriage movement, said carriage position indicator comprising a Meander-indicator comprising an element which is fixedly mounted in the printer and being extended in the movement direction of the carriage and having a length which corresponds to the printing width of the printer, and two further Meander elements supported by the carriage and arranged close to and along the fixed element in order to secure a good inductive coupling between cooperating Meander elements, said two further Meander elements being provided on the carriage at a mutual distance which is such that the loop structures thereof will have a mutual displacement equal to ¼ period of the loop structure relative to the fixed element, and further comprising a sinus generator and a cosinus generator for supplying each respective one of said further Meander elements on the carriage with sinus type signals of the same frequency and having a mutual phase deviation of 90°, thereby generating inductively in said fixed element an output signal of the same frequency and having a phase deviation relative to the supplied sinus signal which is a measure of the carriage displacement within a period of the Meander-loop structure, said device having means for the conversion of said phase deviation to a digital value which comprises a counter having the cycle length of A bits, which is advanced at a frequency equal to A times the frequency of the sinus signal and in synchronism therewith, and a latch circuit to which is supplied a binary number having A bits from said counter and the value of which is consequently changed step-wise and periodically from 0 to the maximum value of the A bits number, and in that the sinus output signal from the fixed indicator element, after having been pulse-shaped by said means for pulse shaping to a rectangular wave with frequency and phase unchanged, is supplied to said latch circuit as a clock signal, thereby locking the latch circuit synchronously with the output signal of the fixed indicator element to binary numbers providing at each occasion a binary representation of said phase deviation within a period of the Meander-loop structure.

2. A device as claimed in claim 1, characterized in that for the suppression of interferences in the carriage position indication supplied by said latch circuit the device comprises a so-called "subber"-circuit, which consists of an adder of which one input is inverted, and an up/down counter having the cycle length of A bits and made to operate with a predetermined lag relative to the latch circuit, in which the output signals from the latch circuit and the up/down counter are supplied to the +input and −input, respectively, of said "subber" circuit, comparing thereby said output signals, and in which, provided said comparison indicates that the lag is greater than the predetermined amount, the up/down counter is advanced one step in synchronism with the pulse-shaped output signal from the fixed indicator element thereby allowing the up/down counter to provide an undistorted, digital carriage position indication.

* * * * *